United States Patent Office 3,786,121
Patented Jan. 15, 1974

3,786,121
METHOD FOR THE FABRICATION OF INSULATED PROFILE MEMBERS
Andre Schaerer, 22 Sangglenstrasse, Zurich, Switzerland
Filed Aug. 20, 1971, Ser. No. 173,399
Int. Cl. B29d 27/04; E06b 7/12
U.S. Cl. 264—47                                                10 Claims

ABSTRACT OF THE DISCLOSURE

A method of manufacturing an insulated profile member useful as a structural element, such as for window frames and paneling, comprising the steps of inserting at least one profile element into a carrier section serving as the mold, introducing a foamable thermosetting resin into such carrier section, foaming the thermosetting resin under pressure, binding the foamed thermosetting resin with the profile element, thus to produce the profile member having a foamed insulating section of good insulating property rigidly bonded with said profile element.

The insulated profile members produced by this invention comprise at least one profile element and a foamed member rigidly bonded therewith. The foamed member has an outer surface which is essentially free of pores and beneath such a foam structure of high density with very fine closed cells.

BACKGROUND OF THE INVENTION

The present invention is directed to novel constructions of insulated profile members and improved manufacturing techniques for the fabrication thereof. The articles produced by this invention, namely the insulated profile members have particular utility in the construction industry, especially for use in making insulated frame constructions for supporting windows, wall panels, and the like, during the fabrication of a structure.

In certain respects, the invention of this development is an improvement upon the subject matter disclosed in my copending United States application, Ser. No. 878,011, filed Nov. 19, 1969, entitled: Method and Apparatus for Continuously Manufacturing Foamed Plastic Profiles, now Pat. No. 3,634,565.

In the construction of buildings or other structures oftentimes there are used structural profile elements, such as window profiles and facade or facing profiles at which there can be mounted, for instance, windows, sliding doors, paneling or the like. Since these profile elements normally are formed of metal, they inherently possess the drawback that, owing to their good heat conductivity, undesirable thermal conduction results from the interior to the exterior of the building, and vice versa producing undesired loss or gain of heat. For one thing, such can cause increased operating costs in maintaining the desired climatic conditions within the building. These metallic profile members, typically when used as window framing and wall panels, are exposed to the atmospheric effects prevailing both externally and internally of the building. Hence, if rather low temperatures prevail outside the building, then such metallic profile members will be seen similarly to possess a temperature at the side of the profile member within the building which is considerably lower than the room temperature of the remaining area within which it is used. This is so because of the rather good heat conductivity possessed by such metallic profile members. This obviously results in thermal losses within the building and many times causes undesired condensation of water upon the framing structure and the immediately surrounding elements, frequently causing property damage, such as the progressive rotting of wooden components subjected to the effects of such condensation water, such as window sills, and also damage to the contents of the area, such as carpeting, furniture and the like. By the same token, if the external temperatures are great, then, again owing to the good thermal conductivity of the framing structure, heat will be undesirably conducted into the interior of the structure, and where such is air conditioned will subject the air conditioning equipment to an increased load in order to maintain the desired climatic conditions within the building. These drawbacks become that much more pronounced the greater the temperature differences, thermal heat conductivity of the metal from which the framing is formed, and the cross-section of the profile members.

Therefore, with the recognition of these problems the prior art has attempted extensively to manufacture insulated profile members which tend to overcome the above-explained drawbacks. One technique which has been proposed is to provide the insulated or insulating profile member with a rubber strip interposed between the metallic profile elements. The rubber strip is intended to provide a thermal barrier between the individual metallic profile elements to mitigate against any undesired thermal conductivity typically experienced when using purely metallic profile members. Yet, the procedures which have been proposed for fabricating such constructions of insulated profile members are extremely complicated, expensive, and with time it has been found that the interposed rubber strip tends to become detached from the metallic profile elements, thereby seriously impairing the longevity of the framing and its useful life.

Another proposal which has been advanced in the prior art is the use of a resinous spacer which is filled into confronting profile elements which themselves are interconnected by one or more joining portions of the metal profile elements. The resin is then usually required to be cured at elevated temperatures in rather complicated curing equipment, and following this operation a machining or other material removal of the joining portions of the metal profile elements must be carried out so as to expose the cured resin. This technique is complicated, both from the manufacturing standpoint and also possibly from the control standpoint, and hence is equally quite expensive to carry out.

Therefore, with the techniques of the prior art discussed above it will be seen that the main thrust was to subdivide an insulated profile member into an external and internal-profile element and to connect both such profile elements together through the agency of a material having lower thermal conductivity, so that there was no direct metallic connection between both profile elements, this interruption in the metallic connection being afforded by the use of either the rubber or resinous spacer elements. While these materials tend to reduce the thermal— or cold flow to a value essentially corresponding to their own thermal conductivity, in many cases these materials themselves were no longer capable of complying with the requirements imposed by room climatization, since the increased humidity of the interior areas of the building at lower temperatures also here tended to produce condensation deposits upon the insulated profile members.

SUMMARY OF THE INVENTION

Hence, from what has been discussed above, it will be seen that the prior art is still in need of insulated profile members which are not associated with the aforementioned drawbacks and also is in need of manufacturing techniques not associated with the drawbacks of the prior art manufacturing procedures. Therefore, a primary object of this invention is to fulfill the need still existing in the art, both from the standpoint of producing improved constructions of such insulated profile members which effectively overcome to a large extent the aforementioned drawbacks and also from the standpoint of manufacturing such improved constructions of insulated profile members.

Another and more specific object of the instant invention is to provide an improved construction of insulated profile member, wherein the thermosetting plastic connection or spacer positioned between completely spaced and out-of-contact profile elements of the profile member possesses good strength and heat resistance properties so as to increase even the strength of the overall profile member.

Still a further significant object of this invention is to provide a novel construction of profile member formed of at least one profile element, but preferably at least two spaced profile elements interconnected by a foamed intermediate member providing a good bond between the spaced profile elements and having characteristics which improve upon the strength properties of the profile member while at the same time affording extremely low thermal conductivity to maximize the desired insulating effect.

Yet a further significant object of this invention relates to a novel method of fabricating insulated profile members as proposed by this development, and specifically in an economically and highly efficient manner, lending itself quite readily to mass-production techniques under increased economies, and wherein foaming of the insulating connection member for the profile element(s) of the profile member is under conditions producing a controlled cell structure of the foam contributing to the desired insulating effect.

Now, in order to implement these and still further objects of the invention, which will become more readily apparent as the descripiton proceeds, the insulated profile members produced by this invention will be seen to comprise generally at least one, but usually at least a pair of spaced profile elements to which or between which there is firmly attached a connecting material. This connecting material is a thermoreactive resin, preferably a thermosetting resin, namely a cross-linked resin, possessing a particularly low thermal coefficient. According to a preferred manifestation of the invention, the thermosetting resin is a rigid foam, and specifically a rigid urethane resin having a closed cell structure. If the foaming action is undertaken with the aid of Freon (difluorodichloromethane), such as Freon-11 then the closed cells will be filled with Freon gas. Owing to the encapsulation of the Freon gas within the closed cells of the foamed resin, the latter in turn being enclosed by the profile elements, the Freon gas is not able to escape or diffuse out of the rigid foam material, and therefore provides a constant high insulating effect.

A rigid urethane foam, in contrast to a thermoplastic foam, possesses better strength and temperature resistance. This advantage particularly comes to the forefront when using a urethane foam having a higher density of 0.2 to 0.8. A structural member formed of such rigid foam already possesses such good strength properties that in connection with an aluminum profile it increases its strength characteristics.

As indicated above, the technique for manufacturing these profile members relies upon utilizing a carrier section which basically constitutes the mold element for the manufacturing process. The carrier section is formed of a material suitable for withstanding the high internal pressures developed during foaming of the resin. The inside walls of the carrier section may be, if necessary, coated with a suitable primer or adhering agent for the profile element or elements which are subsequently inserted into such carrier section. There is then inserted at least one, and preferably two profile elements, in spaced relationship within the carrier section and bearing against the walls thereof. Since the profile element or elements when inserted into the carrier section leave portions of the wall of the carrier section exposed, it is further advantageous to provide a coating of a suitable separating agent at such exposed wall portions. It is also contemplated by the invention to introduce one or more inserts into the mold cavity prior to introducing and foaming the resin. These inserts can constitute a reinforcement for the profile member, but also may be found to be extremely suitable for affording a convenient connection element within the body of the insulated profile member when formed, into which there can be connected any kind of fastening element then securely retained by such inserts. Thereafter, the thermosetting resin, and typically the urethane resin is filled into the mold compartment to an extent such that upon foaming it will completely fill out the mold cavity of the carrier section. Prior to the actual foaming operation, there is placed upon the open end of the mold cavity a closure, such as in the form of a cover plate or sheet, which can be securely clamped with the body of the carrier section in any number of possible different ways. This closure can be either an integral part of the carrier section, such as being formed by a hinged cover provided thereat, or may be a separate closure element which is placed upon the top of the carrier section prior to resin foaming. The thermosetting resin is then foamed within the mold cavity of the carrier section, providing a firm connection with the profile element or elements and thereby producing a novel construction of insulated profile members as contemplated by this invention. It is possible to carry out the manufacturing operation continuously if desired.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
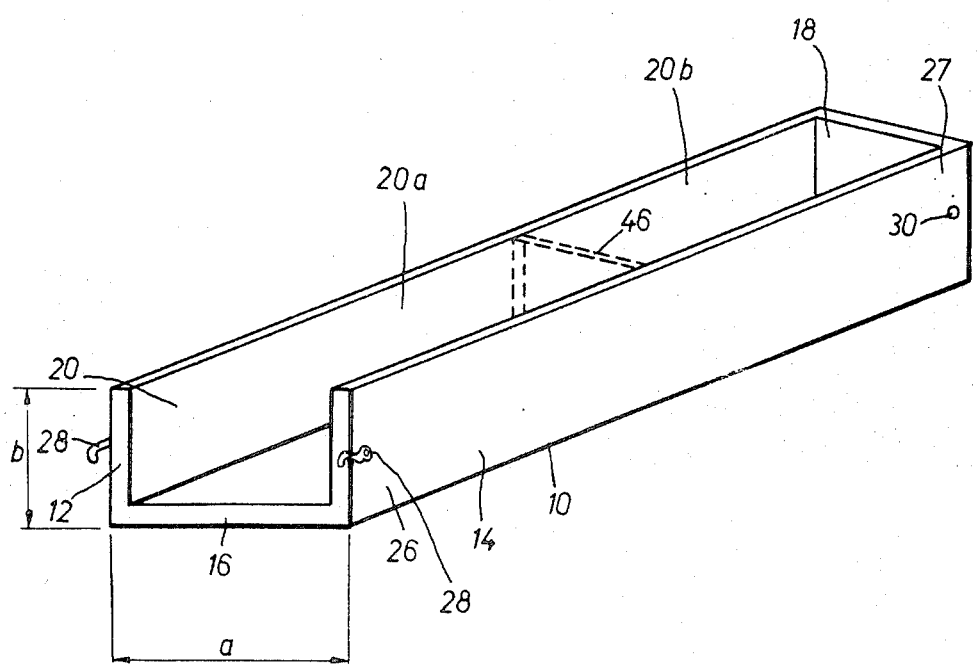
FIG. 1 is a perspective view of a carrier section providing the mold unit during the manufacture of the inventive insulated profile members.
Figure 6:
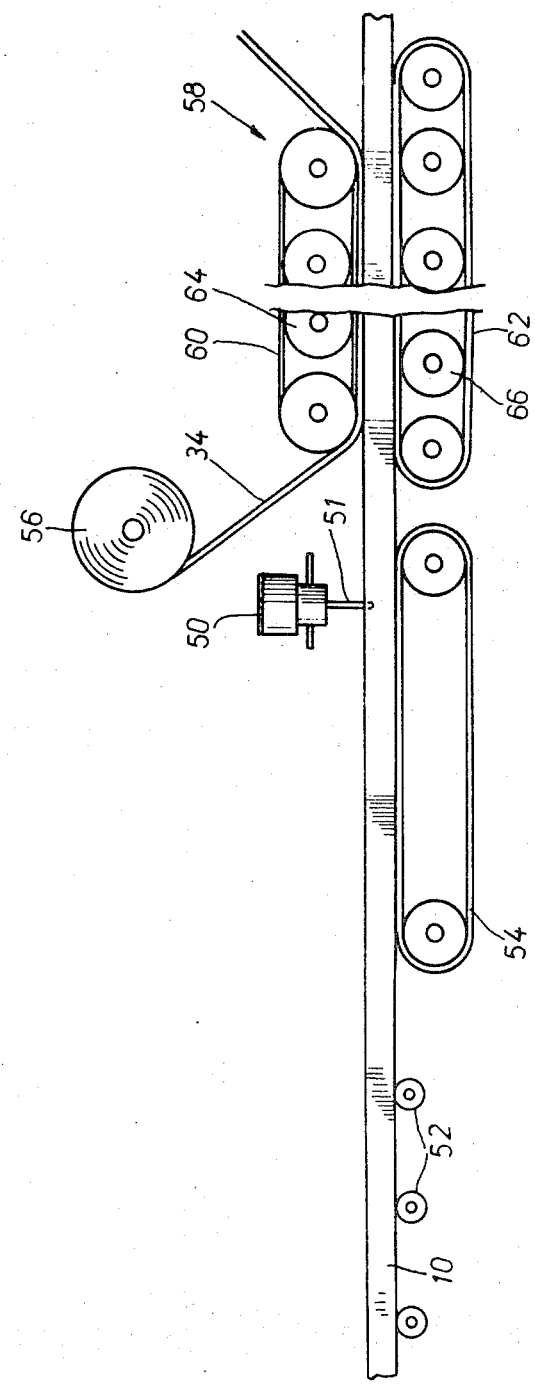
FIG. 6 is a preferred schematic showing of a preferred form of apparatus for continuously manufacturing the insulating profile members according to the teachings of this invention and used in the practice of the inventive method.

Describing now the drawings, it is to be understood that the manufacturing technique for fabricating the insulated profile members, generally indicated by reference character P, resorts to the use of a carrier section 10, best shown in FIG. 1, basically constituting the mold element for the manufacturing operation. This carrier section 10 will be seen to possess a suitable shape, here shown as for instance having a substantially U-shaped cross-sectional configuration which is open at the top. Carrier section 10 therefore is defined by the spaced parallel side walls 12 and 14 interconnected at their lower ends by the substantially horizontally extending floor or bottom portion 16. The end of this carrier section 10 which would assume the leading position through the apparatus, such as that depicted in FIG. 6, is preferably provided with a transversely extending wall 18 bridging side walls 12 and 14, as shown, thereby affording a carrier section construction closed at one end and open at the other end.

Figure 2:
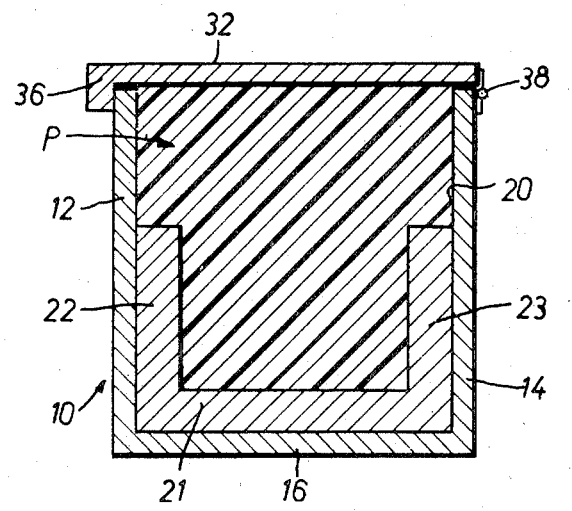
FIG. 2 is a sectional view of the carrier section depicted in FIG. 1, but modified to the extent that same is here shown provided with a hinged closure plate, and depicting therein one profile element during foaming of the resin.
Figure 3:
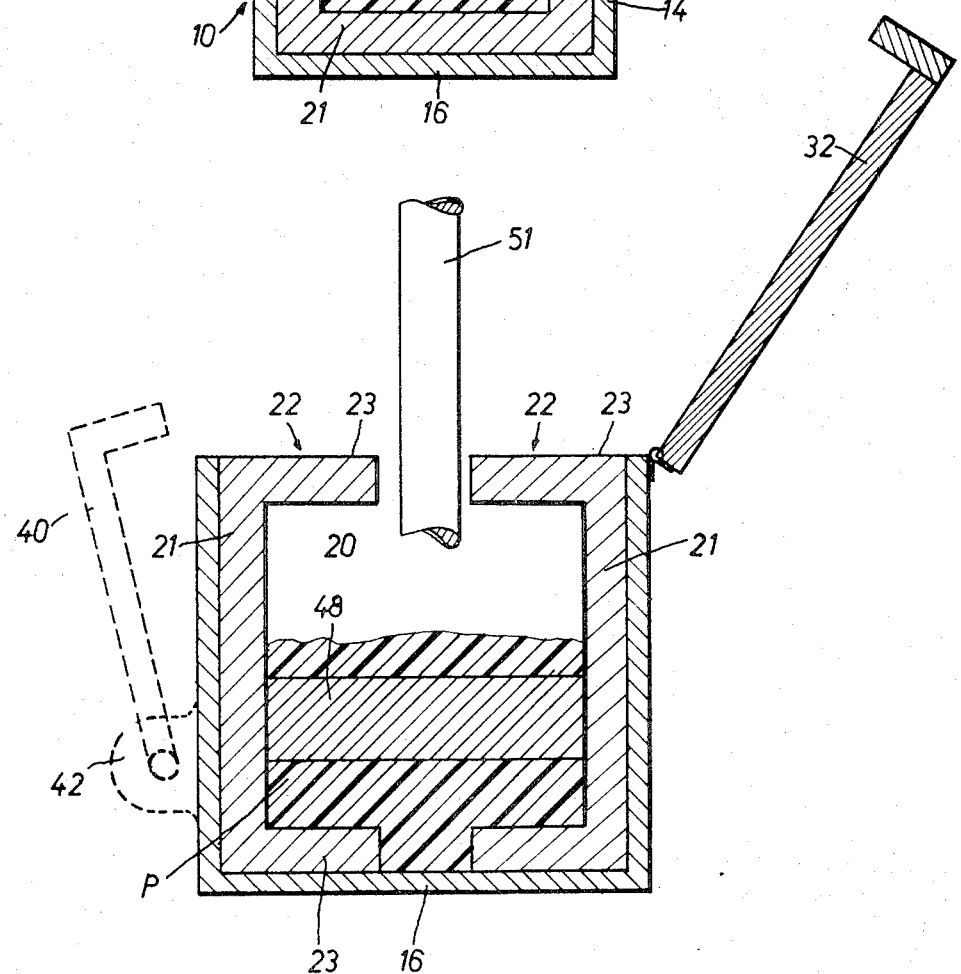
FIG. 3 is a sectional view, similar to the showing of FIG. 2, but with the carrier section containing therein a pair of spaced confronting profile elements and at the location where the foamable resin is introduced therein, and further with the cover or closure plate shown assuming its open position.
Figure 4:
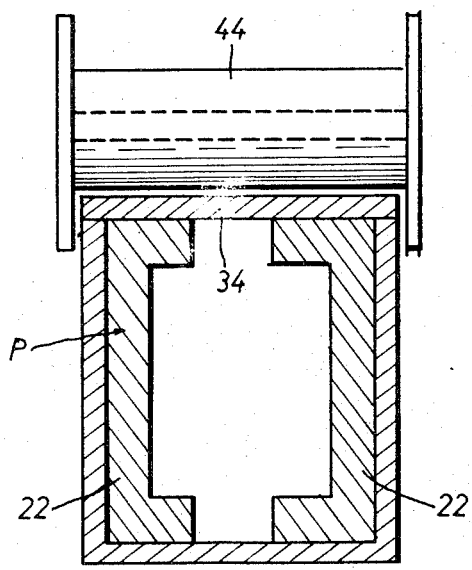
FIG. 4 is a sectional view through the carrier section shown in FIG. 1, containing therein a pair of spaced profile elements, and with a continuous cover or closure member placed thereon and held down by a suitable holddown or press roll.
Figure 5:
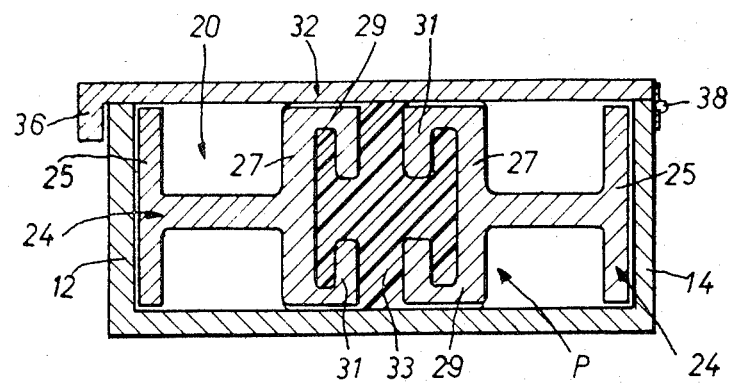
FIG. 5 is a showing somewhat similar to that of FIG. 4, wherein the carrier section however contains a pair of spaced profile elements of a more complicated design where are interconnected by the foamed resin.

The interior hollow space 20 of this carrier section 10 defines the actual mold compartment into which there can be placed the profile element or elements used during the manufacture of the profile members P. FIG. 2 shows an arrangement where a single profile element 22 has been placed into the mold compartment 20 of the carrier section 10, whereas FIGS. 3 and 4 illustrate the situation where respectively a pair of spaced profile elements 22 have been placed into such mold compartment. The profile elements 22 depicted in FIGS. 2 to 4 are essentially of the same type, namely substantially U-shaped profiles. In FIG. 5 the mold compartment 20 contains a pair of substantially H-shaped profile elements 24 for forming a somewhat more complicated profile member P.

While by way of illustration the carrier section 10 has been shown to possess a substantially U-shaped cross-sectional configuration, it is of course possible for other cross-sectional configurations to be used without departing from the underlying concepts of this development. Inasmuch as basically the profile elements 22 and 24 which are being used in the illustrated embodiments are themselves of substantially U-shaped or H-shaped cross-sectional configuration, the illustrated quadratic cross-sectional form of carrier section 10 has been found to be extremely suitable. But, of course, should it be intended to make use of more complicated constructions or other shapes of the profile elements, then appropriately configured carrier sections can be equally used.

Normally, the carrier sections 10 may possess a length of typically anywhere from one to ten meters, depending upon the desired length of the insulated profile members P intended to be manufactured. Further, carrier section 10 can be formed of steeel, aluminum, or any other suitable material having sufficient strength to withstand the high internal pressures developed during foaming of the thermosetting resin, especially the urethane resin. Typically, if there is assumed that the carrier section 10 has a width $a$ of two inches and a height $b$ of two inches a wall thickness of approximately one-quarter inch has been found suitable for most applications. Of course, as the dimensions of the carrier section 10 vary, the wall thickness would have to also be appropriately changed. What is significant is that the strength and design of the carrier section 10 insofar as its physical dimensions and material selection are concerned must be capable of withstanding the high internal pressures developed during resin foaming.

During the manufacturing operation, especially if a continuous manufacturing procedure is contemplated, a number of these carrier sections 10 can be connected with one another "inline" so as to be moved through various processing stations of the equipment, as will be described more fully hereinafter. Hence, for the purpose of conveniently detachably interconnecting each two successive carrier sections 10 to one another, the rear end 26 of each such carrier section 10, remote from the closed front end 27, can be provided with any suitable type of fastening element for securing the leading carrier section 10 with the next trailing carrier section. Here such fastening elements have been conveniently shown in the form of pivotal hook members 28 which can engage with pins or dowels 30 at the leading or front end of the next adjacent trailing carrier section. Hence, it is possible to releasably interconnect in close abutting and sealing contact any number of such carrier sections to provide a so-called train thereof. By the same token, after the insulated profile member or members P have been formed within any given carrier section 10 such can be released and again placed at the end of such train, to participate once more in the continuous manufacturing process. This will be explained more fully in conjunction with the description of the apparatus of FIG. 6.

Furthermore, in order to permit foaming of the resin within a confined closed space there is provided a suitable closure for the open top of each carrier section 10. Such closure may be constituted by a hinged cover 32 as shown for instance for the arrangements of FIGS. 2 and 3, or may be in the form of a continuously infed closure or cover sheet 34, as best shown by referring to FIG. 4, and as will be described also more fully with regard to the equipment of FIG. 6. It is equally immaterial how the closure is provided for the carrier section 10, what is important is that whatever type of closure is used it must be capable of withstanding the high internal pressures which develop within the mold compartment 20 during resin foaming, and such closure must effectively seal the mold compartment 20 during the foaming action. For instance, during resin foaming pressures up to 4 kg./cm.$^2$, corresponding to approximately 57 pounds per square inch, can develop, therefore both the carrier section and the closure element must be capable of taking-up such high pressures and must not be deformed thereby. Thus, in the case of a square cross-sectional configuration of the carrier section 10, and assuming a width of 50 millimeters there is present an internal surface area of 2000 cm.$^2$ per meter length of carrier section. Hence, with a foaming pressure of 4 kg./cm.$^2$ there is developed an internal pressure of up to 8000 kg./m. length of the carrier section. This produces a pressure upon the closure element of 2000 kg. Accordingly, the closure element must be held down with a closing or holding force of up to 2000 kg./m. to safeguard against any deformation of the insulated profile members P.

Holding down of the closure element with this force can be provided by resorting to any number of techniques. For instance, in the case of a hinged closure plate 32 as shown in FIGS. 2 and 3, there may be provided a closure flap 36 at the end of closure plate 32 which can snugly engage tightly over the opposite side wall, such as the wall 12, of the carrier section opposite the location of the hinge connection 38. If needed, closure flap 36 of closure plate 32 may be engaged by a further counter-closure element 40 pivotably supported at location 42 of side wall 12 of the carrier section 10, as shown for instance in FIG. 3. Instead of this technique, and when working with the closure sheet or foil 34 there may be provided one or more holddown rollers 44 for pressing such closure sheet or foil 34 into snug sealing contact with the associated carrier section 10, as shown for instance in the arrangement of FIG. 4. The closure plate, sheet or foil may be similarly formed of any suitable metal, such as steel or aluminum, or any other suitable material, each again having sufficient strength to withstand the high internal pressures developed during resin foaming.

In the case of carrier sections of extreme length, or having a length greater than the length of the desired insulated profile member to be manufactured, it would be possible to subdivide the mold compartment 20 of each carrier section 10 into any desired number of separate mold sub-compartments 20$a$, 20$b$, etc. by using one or more partition walls or spacers 46 (FIG. 1) which are conveniently spaced at any desired position axially of the length of each such carrier section. These partition elements 46 should be preferably coated with a suitable separating agent e.g. hard wax solution to facilitate removal of the fabricated insulated profile members P and partition walls from one another. Such partition elements 46 could be also used for closing the open end 26, of the carrier section 10 shown in FIG. 1 in the event such carrier section is used for itself in the manufacture of the inventive insulated profile members. In this way, and by using a suitable closure there would be then made available a completely closed mold compartment in which resin foaming can positively take place.

Prior to insertion of the profile elements 22 or 24 into each carrier section 10 the inside walls of each such carrier section may be, if necessary, coated with a suitable primer or adhering agent, this being especially the case if the profile elements 22 or 24 are formed of aluminum. A typical adhering agent or primer which can be advantageously used is a polyvinylbutyral wash primer or an epoxy primer. Both of these are commercially available on the market and can be readily obtained from the well known concern, Union Carbide Company. The use of such primer facilitates proper positioning of the profile elements within the mold compartment 20 of the carrier sections 10.

The profile elements 22 or 24 themselves can be formed of steel, aluminum, brass, copper, or any other suitable metal, and even of plastic, typically a rigid polyvinylchloride. Typical values of the modulus of elasticity for plastic, rigid foamed materials, aluminum and iron are respectively 2–3000 kg./cm.$^2$, 100–200 kg./cm.$^2$, 7300 kg./cm.$^2$ and 21,000 kg./cm.$^2$. In any case, the profile elements must possess sufficient structural rigidity for their intended use, especially as insulated profile members. Aluminum is particularly suitable since can be readily extruded into complicated shapes. The dimensions and configuration of the carrier section 10, in other words the inside dimensions of the molding compartment 20 thereof, are of course accommodated to the specific size and configuration of the profile elements used in the fabrication of the insulated profile members P. It has been found that for most applications where the profile elements are used in the fabrication of insulated profile members for window framing, paneling or the like a thickness of 0.8 millimeter to 7 millimeters is generally sufficient to impart the requisite rigidity or structural stability to the finished fabricated profile member.

With the arrangement of FIG. 2 a single profile element 22 of substantially U-shaped cross-sectional configuration is placed within the mold compartment 20 of the carrier section such that the intermediate web 21 of such profile element 22 bears snugly against the bottom wall 16 of carrier section 10, while the spaced upstanding legs 23 of such profile element 22 bear against each of the neighboring side walls 12 and 14. With the arrangement of FIGS. 3 and 4 two such profile elements 22 are placed in spaced relationship into the mold compartment 20, in this case with each of the intermediate webs 21 of each profile element 22 placed against one of the side walls 12 and 14 of the carrier section, while the upstanding legs 23 bear against the bottom and closure cover, respectively, of the carrier section arrangement. With the arrangement of FIG. 5 the profile elements 24, here of substantially H-shaped configuration, are placed in spaced relationship within the mold compartment 20 of the associated carrier section 10, and one of the vertical legs 25 of each respective H-shaped section 24 bears against a side wall 12 or 14 of the carrier section. It will be seen that each substantially H-shaped profile element 24 includes one further upstanding or vertical leg portion 27 having at the upper and lower end thereof a horizontally extending portion 29 followed by an in-turned vertically extending portion 31 to define a leg arrangement similarly having a substantially U-shaped configuration. These profile elements 24 are spaced from one another within the mold compartment 20 as shown, and the foamable resin is placed in the space 33 between the confronting legs 27.

Hence, it will be observed that in each case where there are used at least two profile elements 22 or 24 when such are placed within the mold compartment 20 of the associated carrier section 10, they are disposed in spaced relationship from one another, so that portions of the walls of the mold compartment 20 will be exposed for contact with the foamable resin. Since the carrier section 10 must fulfill the function of imparting to the rigid foam, at the location where it comes into contact therewith, a smooth and non-porous surface, it is advisable to provide the exposed wall surfaces of the mold compartment 20 with a coating of a suitable separating agent, such as a hard wax solution commercially available from the Johnson Wax Company. Through the use of this separating agent the hardened foamed material can be easily separated from the exposed wall portions of the mold compartment 20.

Prior to casting the resin into the mold compartment 20 which has now been prepared in this manner, it would be possible, if desired, to use with any of the embodiments disclosed herein inserts which are placed within the mold cavity and which then will remain embedded in the hardened foam material following curing thereof. Such an insert 48 has been shown in the arrangement of FIG. 3, where it is placed between the spaced profile elements 22. Such insert 48 can be used as a reinforcement insert and/or for providing a convenient connection element into which any suitable type of fastening member can be fixedly embedded when needed. These inserts 48 may be typically formed of wood, although synthetic materials, such as a high density rigid urethane foam can be equally employed.

Now, after the carrier section 10 has been prepared in this manner, thus contains one or more of the profile elements 22 or 24, and possibly also the inserts 48 if such are desired, then such carrier section is passed beneath a mixing and dispensing head 50 (FIG. 6) for the thermoreactive resin, particularly the urethane resin, and is filled to a level in the mold compartment sufficient that upon foaming of the resin it will fill out the complete mold cavity 20. Of course, prior to the actual foaming operation the corresponding closure element 32 or 34 is placed into its mold compartment-sealing position at the top of the carrier section 10, so that the resin is foamed in situ under pressure.

In FIG. 6 there is shown an exemplary embodiment of apparatus which can be successfully employed in practicing the teachings of this invention. The equipment illustrated therein is particularly suitable for the continuous fabrication of insulated profile members consisting of one or more profile elements to which there has been firmly connected the foamed thermosetting resin as previously discussed. The equipment itself will be seen to embody a number of infeed rolls 52 located at the infeed side of the apparatus. Following these infeed rolls 52, which may be either freely rotatable or driven, there is arranged a variable speed conveyor belt 54 which progressively advances the carrier sections 10, previously releasably interconnected into the in-line train-like arrangement, towards the mixing and dispensing head 50 for the resin. Each of these carrier sections 10, at least prior to the time that it reaches the mixing and dispensing head 50, has been prepared in the manner previously discussed, and therefore contains in the mold compartment 20 thereof one or more of the profile elements 22 or 24 and, if desired, the inserts 48.

For purposes of explanation it will be assumed that each carrier section 10 contains at least one pair of spaced profile elements 22 of the type and arrangement as shown in FIGS. 3 and 4. Each thus prepared carrier section 10, with the top thereof still open, is then passed beneath the mixing and dispensing head 50 for the foamable resin, assumed to be a urethane resin, and the required amount of resin mixture is then deposited by means of the discharge orifice or pipe 51 into the interior space between the spaced profile elements 22, in the manner indicated for instance in FIG. 3. An exact dosing of this urethane resin can be obtained, on the one hand, by regulating the resin throughput at the mixing and dispensing head 50 itself, and, on the other hand, by controlling the conveying speed of the variable speed conveyor belt 54. For instance, if it is assumed that an insulated profile member P possesses an internal volume of 2000 cm.³ for each meter of length, then, to fabricate same with a urethane foam having a density of 0.5 gm./cm.³ there will be required 1000 cm.³ of urethane resin mixture for each meter of length of the profile member. If the length of the carrier section amounts to 10 meters, then 10,000 cm.³ or 10 liters of this resin mixture must be deposited into the mold compartment of the carrier section within the available time, that is prior to beginning of the actual foaming process. The amount of time usually available when employing a standard quantity of catalyst for the resin mixture is 30 seconds before the foaming action begins. Hence, the speed of movement of the carrier sections 10 as imparted thereto by the conveyor band 54 must amount to 20 meters per minute and the discharge from the mixing and dispensing head 50 must accordingly amount to 20 liters per minute under the conditions assumed above. As soon as the leading end of the carrier section has arrived beneath the mixing and dispensing head, the latter opens and permits the regulated quantity of urethane resin to flow into the area between the profile elements 22. Now, after the mold compartment 20 of the carrier section 10 has been provided with the required amount of urethane resin, this carrier section 10 is advanced to a further station following the mixing head at which there is applied the closure element, here assumed to be a closure sheet or foil. This closure foil or sheet 34 may be a continuous foil which is paid-off a supply roller 56 and passed between a twin belt conveyor arrangement 58 having an upper belt 60 and a lower belt 62. The carrier section 10 which contains the urethane resin and which has now also been covered by the continuously applied cover sheet or foil 34 is moved between the conveyor belts 60 and 62 and kept under pressure by means of the holddown rollers 64 and 66 until the desired reaction has taken place and the foam has hardened, whereupon the foamed profile member can be removed from the carrier section.

At this point it might be remarked that the resins which are advantageously employed in the practice of the inventive method consist of well known components for manufacturing rigid urethane foams, these components being mixed within the mixing head 50 prior to flowing into the carrier section 10. One of the components, subsequently called Polyol component A, consists of a known polyglycolether formed by condensation of propyleneoxide and trimethylpropane with a hydroxy number of preferably 350 to 500. To this polyol there are added 5 to 50 parts by weight monofluorotrichloromethane and 1 to 3 parts of a catalyst, such as N-methylmorpholine, triethylenediamine or tindioctoate, the first serving as a blowing agent and the second as a catalyst.

The component B consists of a commercially available isocyanate, such as 4,4′ diisocyanatodiphenylmethane.

In order to increase the hardness of the rigid foam an appropriate filler, such as asbestos powder, quartz powder, talcum powder or clay powder may be added, from 10 to 100 percent by weight, to both components A and B.

A workable composition of the components A and B suitable for the purposes of this invention is given hereafter:

| Component A: | Parts by wt. |
|---|---|
| Polyglycolether hydroxyl number 490 | 83 |
| Monochlorotrifluoromethane (Freon-11) | 30 |
| Triethylenediamine | 2 |
| Quartz powder | 85 |
| | 200 |

| Component B: | |
|---|---|
| 4,4′ diisocyanatodiphenylmethane | 100 |
| Quartz powder | 100 |
| | 200 |

Both components are continuously pumped in equal amounts by weight into the mixing head where a continuous intensive mixing occurs. The mixed components A and B flow out into the carrier section. Now the known exothermic reaction occurs between the polyol and the isocyanate which, on the one hand, brings about the polymerization of the resin components and the foaming of the resin mixture containing the freon. The reaction is exothermic so that the monofluorotrichloromethane acting as a blowing agent starts to boil and causes the hardening resin mix to foam. After a reaction time of a number of minutes the foam has hardened to such an extent that it has fixedly interconnected the profile elements with one another and the finished insulated profile member can be removed from the associated carrier section.

The reactive resin mix flows out of the orifice of the mixer 50 into the profile elements contained in the carrier section which acts to carry off the heat developed by this exothermic reaction, with the result that the blowing agent will not be as effective as in the center of the foam. As a result, a denser skin of a higher density foam will develop in the outer layers of the foamed profile members which improves its mechanical properties, especially as concerns tensile strength and load bearing resistance. The outer surface will be dense and essentially will not display any porosity, and underneath this dense and rather heavy skin having good mechanical properties there will be present a foamed structure of high density with very fine closed cells, the diameter of which increases towards the center of the profile member, so that the center of the foamed section exhibits a foam having larger cell size of lower specific density.

The carrier sections which are in trailing relationship with respect to the leading carrier section are then successively directly placed in the same manner beneath the mixing head, partially filled with the foaming resin mix, closed in the manner described above, whereby these profiled members can be continuously fabricated.

As each carrier section has completed the production of the profiled members it can be detached from the next trailing section and again placed at the infeed side of the installation of FIG. 6, then prepared in the manner previously described, and again used by being attached to the lastmost or trailing carrier section of the train for fabricating further profiled members.

In the event it is desired to fabricate insulated profile members having a predetermined length less than the length of the particularly employed carrier section, then the profile elements can be cut to desired length and inserted into the carrier sections. Then between the individually cut-to-length profile elements there is placed a partition wall 46 (FIG. 1) which previously has been prepared with the separating agent, this partition wall for instance being in the form of a metallic plate and cut to the cross-section of the insulated profile members to be manufactured. After foaming of the resin mix the separation plates can be removed, so that the individual lengths of the insulated profile members can be easily separated from one another. Of course, it would also be possible to cut to the required size the profile members after they have been manufactured and to dispense with the use of the partition members.

Furthermore, while with the described form of equipment depicted in FIG. 6 it is assumed that there is used a continuous carrier foil in conjunction with the holddown pressure rolls, it would of course be possible, as previously explained, to employ carrier sections which themselves are equipped with a cover plate, such as the hinged cover plates discussed above in conjunction with FIGS. 2, 3 and 5. As also previously mentioned, it is immaterial whether a separate closure element is used, or there is used a closure element which itself is attached to the body of the carrier section. Furthermore, the manner in which each such closure element is sealingly clamped with the carrier section is equally immaterial, and various techniques can be used apart from the mechanical locking described in connection with the hingedly connected cover plates and the holddown pressure rolls used in connection with the cover sheet or foil, for instance pneumatic pressure as a holddown force equally being contemplated. Furthermore, even in the case of the hinged cover arrangements it would be possible to additionally employ a holddown mechanism, such as the press or pressure rolls or even the pneumatic holddown pressure concept. What is important is that a good seal be provided to keep the foam tightly encapsulated in the mold compartment or cavity during the foaming operation, so that there is produced an insulated profile member having the urethane resin foamed under pressure. By so doing, there is provided a smooth surface or skin which is dense and essentially without pores, and below such a foam structure of high density having very fine closed cells or pores, so that the foamed portion of the profile member itself has a structure similar to a bone. Since this has a favorable effect upon the strength characteristics of the profile members, the profile elements themselves can be much thinner, again providing considerable saving in cost.

While there is shown and described present preferred embodiments of the invention, it is to be distinctly understood that the invention is not limited thereto but may be otherwise variously embodied and practiced within the scope of the following claims. Accordingly,

What is claimed is:

1. A method of manufacturing an insulated frame element such as a window frame element having a rigid foam body with metallic profile members rigidly bonded thereto with longitudinally extending exposed metallic surfaces, said foamed body separating the metallic members from contact with each other and having an exposed skin surface intermediate the metallic surfaces, said method comprising the steps of: providing a longitudinally extending carrier section having enclosing walls and providing a closeable member therefor, placing said elongated metallic profile elements in said carrier section with longitudinally extending surfaces thereon disposed adjacent a pair of longitudinally extending walls of said carrier section and spacing said metallic profile elements from each other to prevent metal contact therebetween, introducing a foamable thermosetting resin into the carrier section, closing the carrier section by said closeable member and sealing the carrier section for a subsequent foaming of the resin, allowing said resin under high internal pressure in said closed and sealed carrier section to produce the intermediate foam body thereby forming said intermediate body with closed cells having diameters which increase towards the center of the foamed body and thereby joining said metallic members to said intermediate foam body, and forming a dense and essentially pore-free skin surface on said intermediate foam body, and removing from said carrier section the resulting frame element.

2. The method as defined in claim 1, including the step of coating the walls of the carrier section coming into contact with the resin with a separating agent to facilitate removal of the foamed resin body from the carrier section.

3. The method as defined in claim 1, further including the step of placing into the carrier section, prior to introduction of the foamable resin, at least one insert, and embedding such insert in the foamed resin body.

4. The method as defined in claim 3, including the step of using as the insert a material capable of receiving fastening elements therein.

5. The method as defined in claim 3, including the step of using as the insert a material reinforcing the fabricated frame element.

6. The method as defined in claim 1, including the step of cutting-to-length individual metallic members having a desired predetermined length corresponding essentially to the length of the finished frame element to be fabricated, placing a number of such metallic members into a mold compartment of the carrier section in spaced relationship from one another, separating each two adjacent cut-to-length metallic members from one another by a partition member sub-dividing the mold compartment into respective separate mold sub-compartments, filling each of the sub-compartments with the foamable resin, closing the mold compartment of the carrier section, foaming the resin in each sub-compartment of the carrier section, to bond the foamed resin with each metallic member, detaching the partition members from each of the thus produced frame elements each containing said metallic member and the therewith bonded foamed resin to produce simultaneously a plurality of such frame elements each of the desired length.

7. A method in accordance with claim 1 including the step of using a thermosetting urethane resin to provide a rigid foam and producing within the mold during foaming pressures up to 4 kg./cm.$^2$.

8. A method in accordance with claim 1 including the step of depositing the resin between said metallic members with said resin foaming upwardly between said metallic members.

9. A method in accordance with claim 1 including the step of using a metallic carrier section for conducting heat to the ambient atmosphere.

10. A method in accordance with claim 8 including the step of using metallic members having a height approximating that of the enclosed carrier section and abutting said cover member against the top surfaces of said metallic members when closing said carrier section.

References Cited

UNITED STATES PATENTS

| | | | |
|---|---|---|---|
| 3,204,324 | 9/1965 | Nilsen | 49—DIG. 1 |
| 3,332,170 | 7/1967 | Bangs | 49—DIG. 1 |
| 2,838,100 | 6/1958 | Follows | 264—45 X |
| 3,099,516 | 7/1963 | Henrickson | 260—2.5 AZ |
| 3,251,912 | 5/1966 | Fish | 264—45 |
| 3,384,691 | 5/1968 | Werssman et al. | 260—2.5 AZ |
| 3,511,736 | 5/1970 | Nielsen et al. | 264—45 X |
| 3,523,989 | 8/1970 | Murer | 264—45 X |
| 3,561,181 | 2/1971 | Bassett | 264—45 |
| 3,634,565 | 1/1972 | Schaerer | 264—47 X |

OTHER REFERENCES

D.A.S. 1,245,567, July 27, 1967, E. Hueck.

DONALD E. CZAJA, Primary Examiner

H. S. COCKERAM, Assistant Examiner

U.S. Cl. X.R.

49—DIG 1; 52—309, 656; 264—45, DIG 14, DIG 76, DIG 77